United States Patent [19]

Gabriele

[11] 4,405,270
[45] Sep. 20, 1983

[54] POT BROACH MACHINE WITH TURN-OVER LOADER

[75] Inventor: Leonard A. Gabriele, Warren, Mich.

[73] Assignee: Lear Siegler, Inc., Santa Monica, Calif.

[21] Appl. No.: 293,674

[22] Filed: Aug. 17, 1981

[51] Int. Cl.³ .................. B23D 37/12; B23F 5/28
[52] U.S. Cl. .................................. 409/244; 148/374; 409/7; 409/60; 409/252; 409/269; 409/275
[58] Field of Search .............. 409/6, 7, 59, 60, 244, 409/250, 251, 252, 256, 257, 269, 270, 275; 198/374, 399

[56] References Cited

U.S. PATENT DOCUMENTS

| | | | |
|---|---|---|---|
| 2,382,628 | 8/1945 | Green | 409/251 |
| 2,529,603 | 11/1950 | Galt | 198/399 |
| 3,021,764 | 2/1962 | Durdin | 409/7 |
| 3,656,401 | 4/1972 | Psenka | 409/59 |
| 4,027,574 | 6/1977 | Russell | 409/7 |
| 4,192,415 | 3/1980 | Krener et al. | 198/374 |

Primary Examiner—Z. R. Bilinsky
Attorney, Agent, or Firm—Barnes, Kisselle, Raisch, Choate, Whittemore & Hulbert

[57] ABSTRACT

A broaching machine broaches a multiplicity of generally flat work pieces having a projection at only one side, which are advanced in a single file with the projections extending in the same direction. In order to broach the work pieces in stacked pairs in which the peripheries of the work pieces are continuous, rather than spaced apart by confronting projections, half of the work pieces are inverted and a pair consisting of one inverted work piece and one work piece which has not been inverted are stacked together and presented to a pot broach which broaches the peripheries of both work pieces of the pair in continuous cutting strokes. The finished work pieces are advanced away from the broaching station in stacked condition and are separated into two groups, one of which consists of the bottom work pieces of the pair and the other consists of the top work pieces of the pair. This places all work pieces in the same orientation with respect to the lateral projection. The work pieces are then fed alternatively into a single file conveyor.

10 Claims, 8 Drawing Figures

POT BROACH MACHINE WITH TURN-OVER LOADER

BRIEF SUMMARY OF THE INVENTION

The present invention relates to a high production pot broach adapted to broach the exterior of a sequence of work pieces arranged in pairs. The particular broach is a vertical push up broach in which a pair of work pieces are located in stacked relation beneath the lower open end of a pot broach and are pushed upwardly through the broach, emerging at the top as finished work pieces.

The machine is designed for finishing work pieces of generally flat cylindrical configuration but having at one side thereof a narrow cylindrical extension or smaller diameter than the exterior surfaces of the work pieces which are to be broached.

If the parts are assembled together with like orientation it will be apparent that the reduced cylindrical extension will result in a gap between the exterior surfaces of the two work pieces to be broached. This is not an acceptable condition.

One of the requirements of a machine of this type is that the pieces must be fed automatically and all of the operations performed automatically so that a high production rate may be obtained. Moreover, since this broaching operation may be performed by a machine which is in a production line of different types of machines, it is also a requirement that the work pieces be fed in single file along an inchute or conveyor in which the work pieces have like orientation. Similarly it is a requirement that the finished work pieces as delivered by the machine have a subsequent operation advance in single file along an outchute or conveyor in which all of the work pieces have like orientation.

With these requirements in view, the machine comprises mechanisms which divide advancing work pieces into two groups, which may be done by displacing alternate work pieces for continued advance in different paths. All of the work pieces in one of the paths are then inverted. This has been most efficiently performed by advancing these work pieces along an 180° curved path located in a vertical plane so that upon arrival at the end of the path all of the work pieces of one group will have been inverted. At the same time the work pieces which have been diverted to the other path are simply advanced along a separate chute or conveyor without inversion and the work piece in the two groups are brought together in pairs in which the reduced extension of the lowermost work piece is at the bottom and the reduced extension of an upper work piece is at the top. With this arrangement the larger generally cylindrical surfaces of the two work pieces are continuous and may be broached in a single broaching operation in which the cutting edges of the broach are not required to bridge a gap between the two work pieces.

When the work pieces emerge from the top of the broach they are again advanced along an outchute or conveyor provided with means for separating the work pieces into a first group consisting of the uppermost work pieces and a second group consisting of the lowermost work pieces. Thereafter one of the groups is further advanced through an inverter which may be similar or identical to that provided at the infeed side of the machine. Thereafter the individual work pieces from the two groups are alternately fed into a single outchute or conveyor in which all of the work pieces have like orientation.

BRIEF DESCRIPTION OF THE DRAWINGS

FIG. 8 is a fragmentary side view of the work piece inverter at the outlet side of the machine.

DETAILED DESCRIPTION

Figure 1:
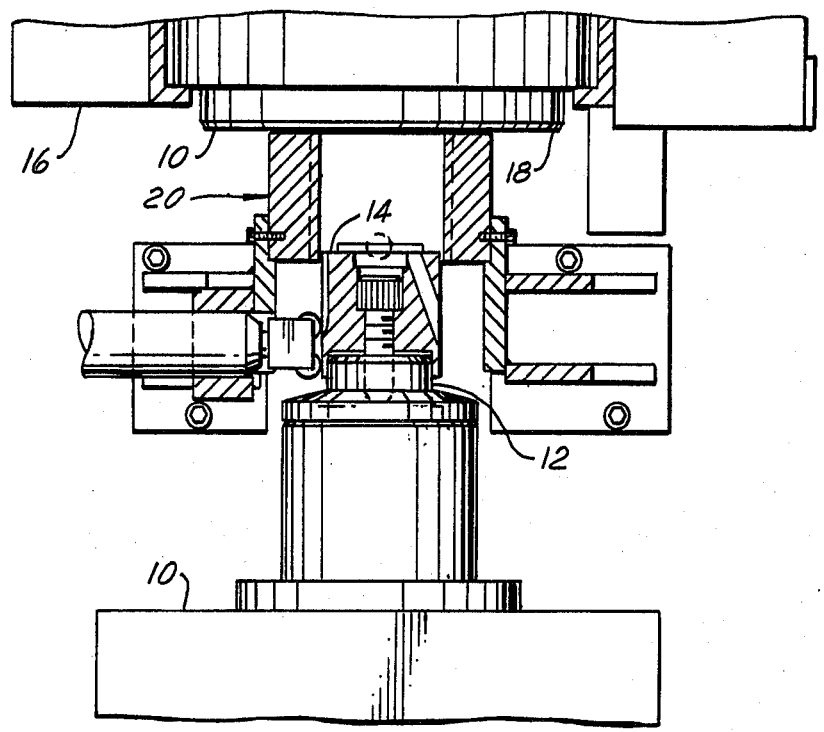
FIG. 1 is a fragmentary elevational view through the broaching apparatus including the pot broach and the mechanism for effecting upward movement of the work pieces through the broach.

Referring first to FIG. 1 the machine comprises a base on which is mounted a hydraulic cylinder 10 including a piston, a portion of which is indicated at 12 which is connected to a pusher 14. The broaching machine comprises a support, the lower portion of which is seen at 16, which is adapted to support a vertical pot broach 18 having internal teeth adapted to perform a broaching operation on the exterior of generally cylindrical work pieces pushed upwardly completely through the broach.

Guide structure indicated generally at 20 is carried by the broaching machine directly beneath the open bottom end of the pot broach and ensures proper entry of stacking pairs of work pieces into the broach. As is customary in broaching operations of this type, the work pieces are guided by the broach as they are pushed through it and accordingly the exterior surfaces of the work pieces are broached with substantially the same accuracy as is provided on the interior broaching elements of the broach.

Figure 2:
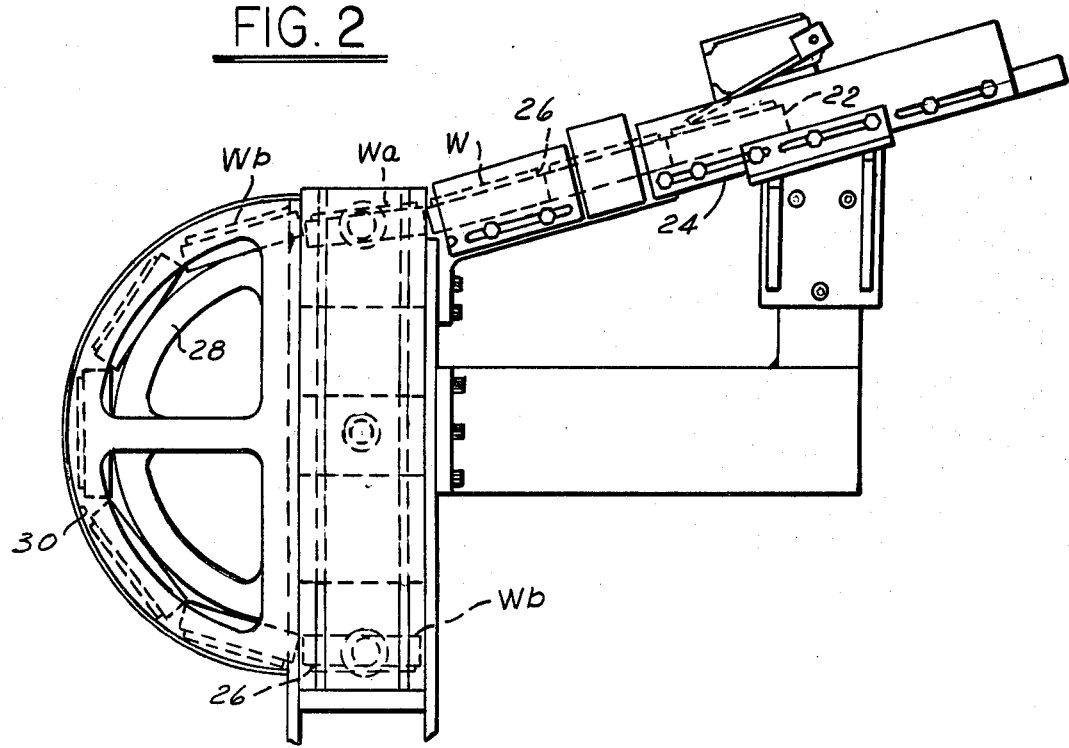
FIG. 2 is a fragmentary side elevation of the inverter portion of the infeed structure.

Referring now to FIG. 2 the work pieces W are seen to comprise a generally cylindrical body portion 22 and they are advanced in an inchute 24 with the abutting peripheral portions of the work pieces in engagement. At one end each of the work pieces W is provided with a reduced extension 26 and as seen at the right of FIG. 2 it will be observed that all of the work pieces being advanced in the chute 24 have the same orientation so that all of the reduced extensions 26 extend upwardly.

As the work pieces reach the position occupied by a single work piece here designated Wa, the work pieces are separated into two groups. The work pieces Wb make up one group and these work pieces are advanced in an inverter which comprises a chute 28 including an outer guide plate 30 which is curved through 180° and occupies a vertical plane. Accordingly, as seen in this Figure, the bottom work piece Wb is located directly below the location of the work piece Wa where diversion of the work pieces into two groups occurs. The movement of the work pieces Wb to the lowermost position illustrated in the Figure results in inversion of the work pieces so that the reduced extension 26 now is located at the bottom side of the work pieces, as shown.

Figure 3:
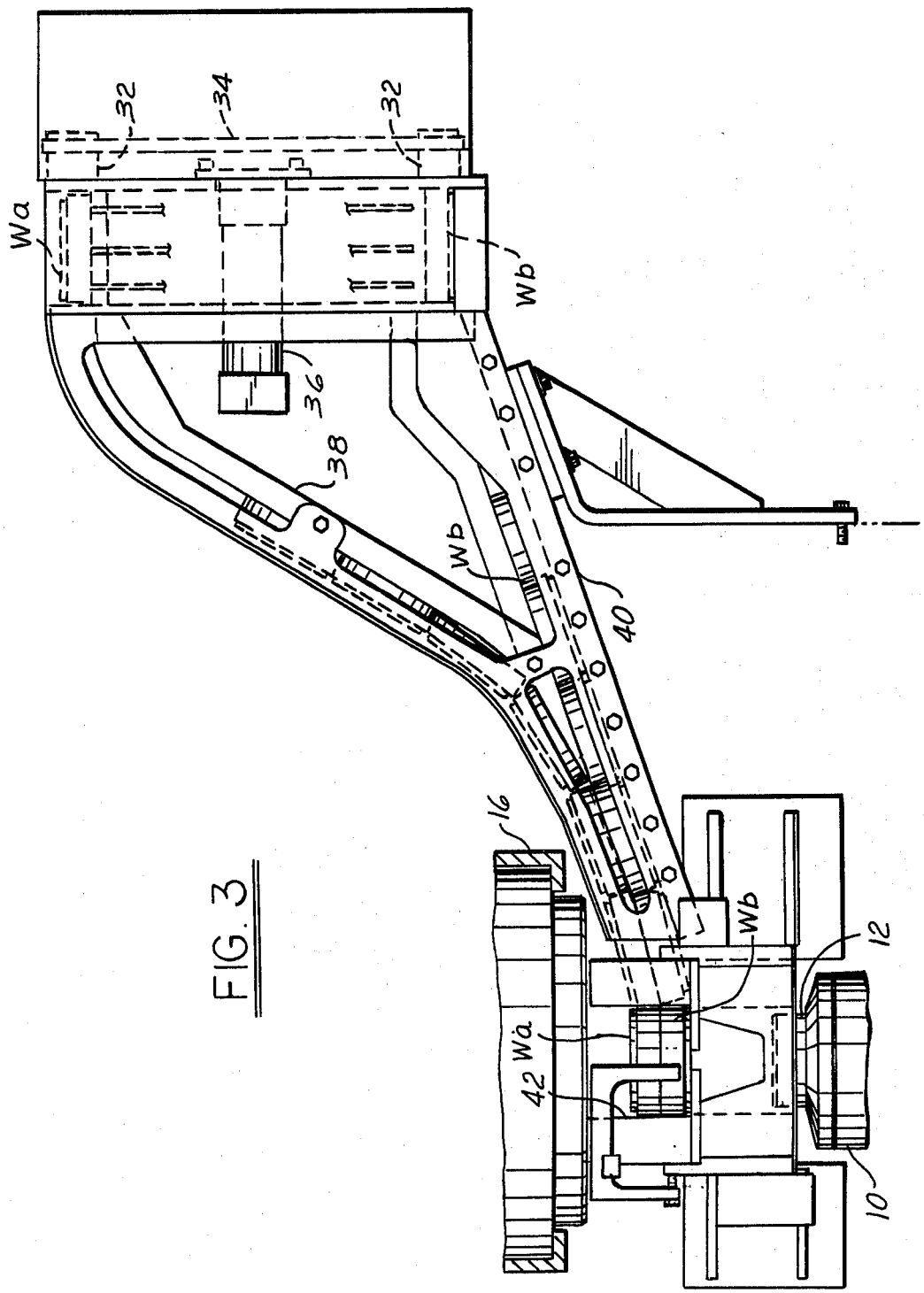
FIG. 3 is a fragmentary elevational view through the infeed structure which combines pairs of work pieces with opposite orientation.

Referring now to FIG. 3 the inverted work pieces Wb seen at the bottom of FIG. 2 now is positioned directly beneath a work piece Wa.

At this time work pieces Wa and Wb are advanced by pusher elements 32 carried by a pusher bar 34 connected to the piston of a small cylinder 36 so that work pieces Wa advance down a steeply inclined chute 38 into position above inverted work pieces Wb which are advanced along the inchute 40.

The leading upward work pieces Wa and the inverted lower work pieces Wb are registered by engagement with suitable locating means including a stop 42. At this time it will be observed that the exterior surfaces of the work pieces Wa and Wb which are to be machined by the broach constitute a single continuous surface without a gap therebetween, which is a requirement for an efficient broaching operation.

Figure 4:
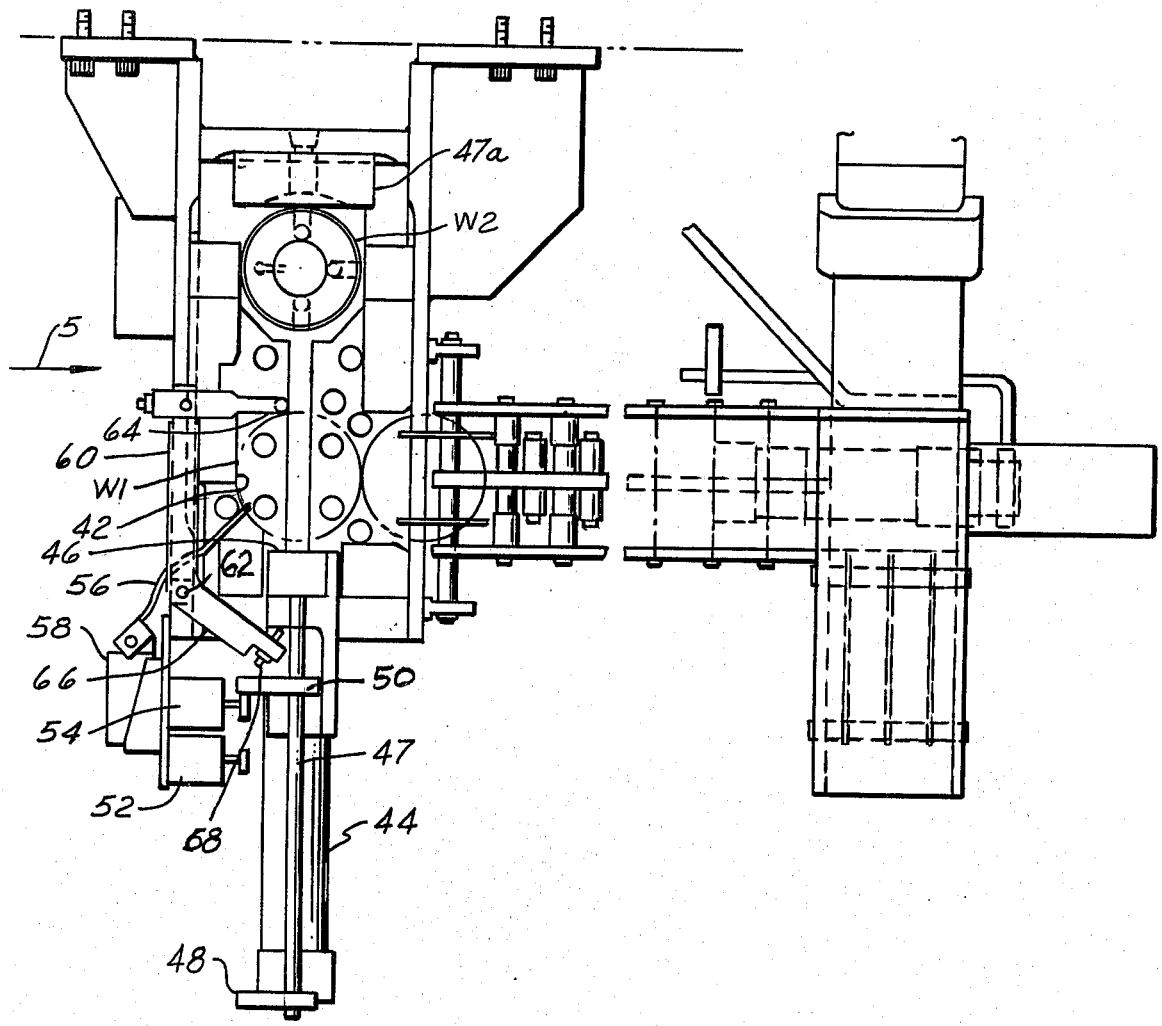
FIG. 4 is a fragmentary plan view showing the feed structure for advancing stacked pairs of work pieces into broaching position.
Figure 5:
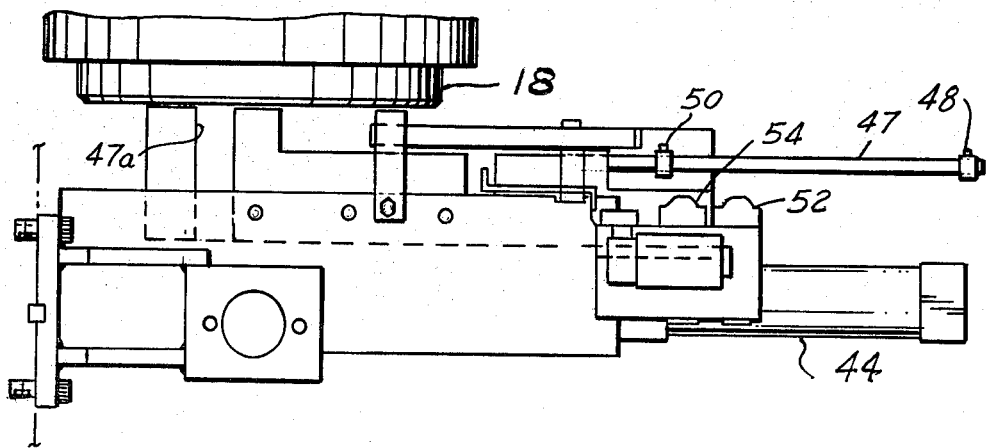
FIG. 5 is a fragmentary end view located in the direction of the arrow 5—5, FIG. 4.

Referring now to FIGS. 4 and 5 the leading pair of stacked work pieces Wa and Wb seen in FIG. 3 are located against the stop 42 in the position indicated at W1. Means are provided for advancing this stacked pair of work pieces into broaching position beneath the lower end of the pot broach. This means comprises a cylinder 44 having a pusher 46 connected to a piston therein and adapted to engage the stacked pair of work pieces and to position them to the position illustrated in this Figure at W2 against a stop 47a.

As indicated at the outset this broaching machine is intended for fully automatic operation and is accordingly provided with automatic controls which sense the location of the work pieces and the movable components of the machine, so as to initiate the successive operations in proper order. Since controls of this type are familiar in all automatic machine tools, no attempt has been made to disclose all of these controls. However, it will be noted that in FIG. 4 the location of the piston which advances the pusher 46 to locate the pair of work pieces in position at W2 is effective to move a control rod 47 having switch actuating dogs 48 and 50 thereon for suitable actuation of control switches 52 and 54 respectively. Similarly a pivoted arm 56 is provided which senses arrival of a pair of stacked work pieces at the position W1 and controls a suitable limit switch 58.

A gate arm 60 pivoted as indicated at 62 includes a finger 64 which is engaged by the work pieces as they move from position W1 to W2 and swing the gate arm 60 counterclockwise. Arm 60 includes an angled extension 66 having an abutment screw 68 which is engaged by the adjacent side of the pusher 46 when retracted so as to reposition the fingers 64 ahead of the next pair of stacked work pieces.

Suitable means not shown sense the location of a pair of work pieces directly beneath the broach in position to be pushed through the pot broach by the broach pusher 14 seen in FIG. 1.

Figure 6:
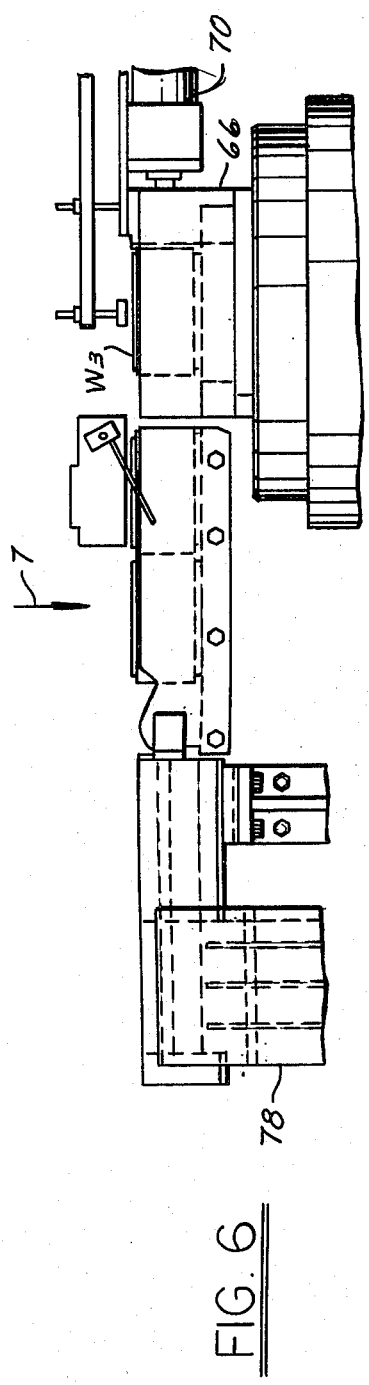
FIG. 6 is a fragmentary side view illustrating the mechanism for moving broached pairs of work pieces toward the machine outlet.
Figure 7:
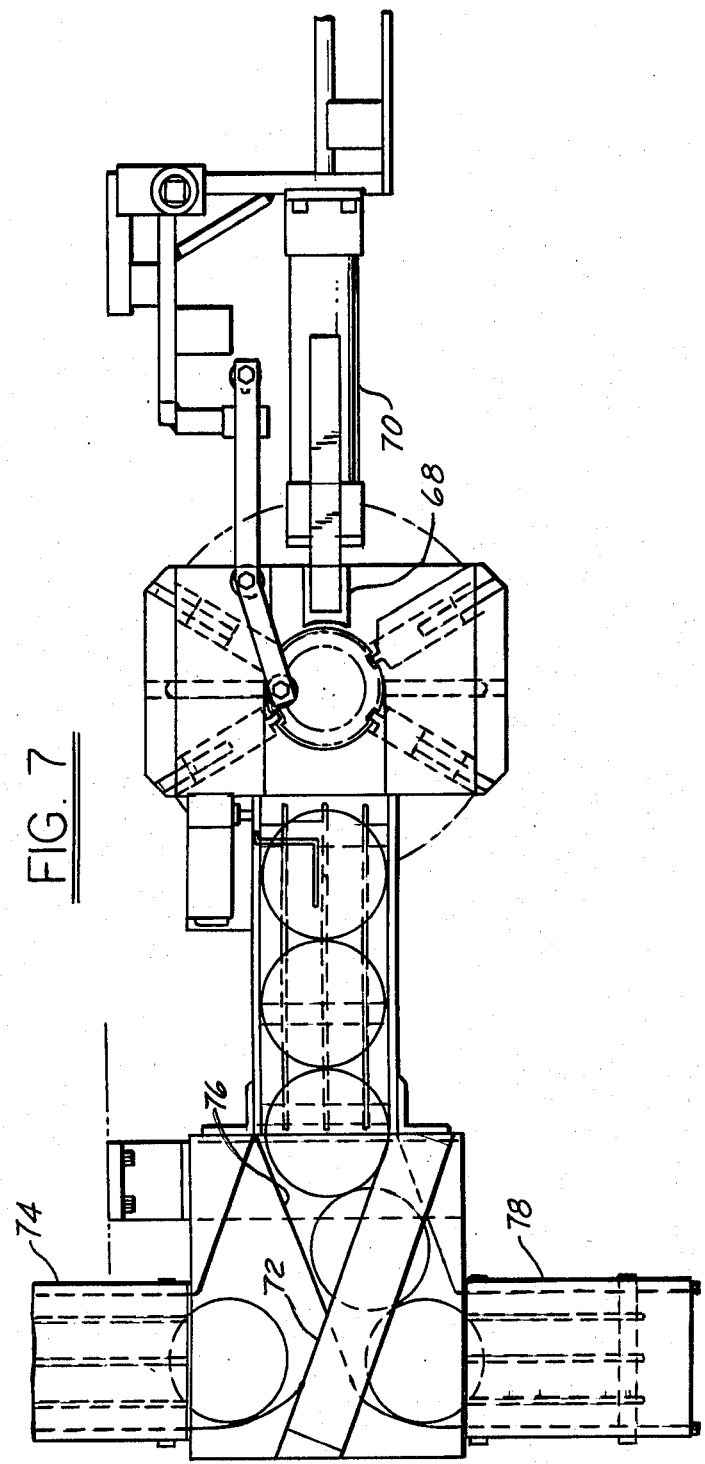
Figure 8:
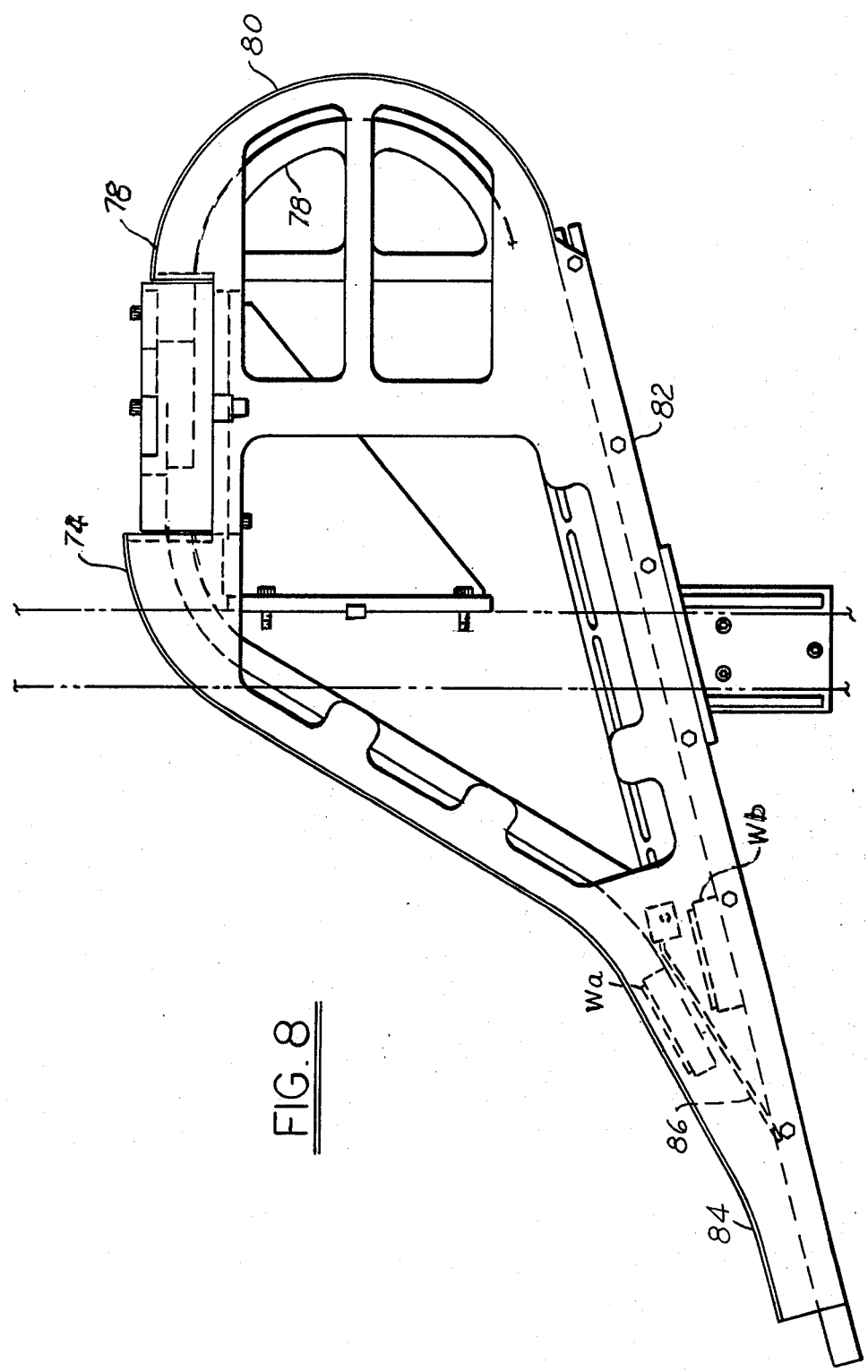
FIG. 8 is a plan view of the apparatus located in the direction of the arrow 7—7, FIG. 6.

Referring now to FIGS. 6-8, the portion of the machine for re-orienting the finished work pieces and for combining them in similarly oriented condition in a single outlet or discharge conveyor is shown.

Referring first to FIG. 6 the stacked, broached work pieces here designated as W3 are supported by support structure indicated at 66 as they emerge from the upper end of the pot broach. The broach pusher returns downwardly to its initial position for receiving the next pair of stacked work pieces. The work pieces in the position W3 are engaged by a pusher 68 carried by the end of a piston within a cylinder 70 so that the pair of work pieces is advanced to the left as seen in this Figure. As the work pieces are advanced to the left they are separated into two groups by apparatus illustrated in FIG. 7. The uppermost of the pairs of work pieces as they are advanced intermittently by the pusher 68 engage an inclined guide bar 72 and are diverted to form a group advanced to one of the outlet conveyors 74. The bottom work pieces of the stacked pair engage an oppositely inclined guide surface 76 and are diverted into a group advanced to the inverting outchute 78.

Referring now to FIG. 8 it will be observed that the inverting outchute 78 includes the 180° arcuately curved portion which occupies a vertical plane and includes the cover 80 which retains the parts in position. Thus, as the bottom parts advance into the inverting conveyor 78 they are substantially inverted and advance in their original orientation along the conveyor track 82.

The top parts of the pairs of work pieces diverted to the conveyor 74 descend into the final outlet chute 84 and a pivoted gate 86 is provided which ensures that the work pieces Wa which are advanced through the broaching apparatus without inversion are alternated with the work pieces Wb which have been inverted twice and which accordingly have the same orientation at this time as the work pieces Wa. Accordingly, the work pieces advance in single file to the final delivery or outlet conveyor with the parts in the same orientation suitable for operations thereon by subsequent machines, if desired.

Summarizing the foregoing in more general terms the apparatus comprises a loader conveyor system including a main inlet section in which a series of work pieces is advanced in a single continuous array. The advance of the work pieces may be by gravity on an inclined chute or conveyor or it may be the result of separate feeding means. In any case the work pieces are automatically advanced intermittently as preceding work pieces are arranged in a series of stacked pairs and are broached.

The work pieces are of generally cylindrical configuration and have one flat side, the opposite side having a projection thereon. If the work pieces were stacked together with the same orientation with respect to the projections, the outer cylindrical surfaces, which are to be broached, would present a gap to the broaching too, which is undesirable. The main inlet section of the loader conveyor divides into two branches, one of which is defined as a first branch inlet inverter section and includes a curved enclosed chute occupying a vertical plane and extending through substantially 180° so that work pieces moving through the curved inverter section are inverted. A second branch inlet section is provided which also receives work pieces from the main inlet section and these work pieces pass through the second branch inlet section without inversion.

The two branch inlet sections include portions which converge at an assembly section of the conveyor system, and are arranged so that the work pieces are deposited in the assembly section in vertically stacked relation to the flat sides of the work pieces in content. Thus the exterior cylindrical surfaces of both work pieces are presented to the broaching tool without a gap.

Having stacked the work pieces as aforesaid, means are provided to advance the stack of work pieces into position beneath an open bottom end of a generally tubular pot broach having cutting tools thereon. The pot broach is disposed vertically and a pusher is provided beneath the lower end of the pot broach on which the stacked pair of work pieces is received. Thereafter a piston and cylinder device raises the pusher through the broach, pushing the pair of work pieces completely through the broach and out of its upper end, where they are received and retained as the pusher is lowered for cooperation with the next succeeding pair of stacked work pieces.

To provide a complete machine tool capable of receiving a sequence of unbroached work pieces and discharging them from the machine tool in broached condition and in a single solid array an unloader conveyor system is provided.

This unloader conveyor system comprises a first outlet section for receiving a stacked pair of broached work pieces. Transfer means are provided to advance stacked pairs of broached work pieces from the top of the pot broach along the first outlet section. A first branch outlet inverter section is positioned to receive the lower work pieces of the stacked pairs and to invert the work pieces as they pass therethrough. A second branch outlet section is positioned to receive the upper work pieces of the stacked pairs and to pass work pieces therethrough without inversion. The unloader conveyor system includes a main outlet section which receives work pieces from both branch outlet sections in a single series with all broached work pieces having the same orientation with respect to the lateral projections thereon.

I claim:

1. The method of broaching a succession of pairs of stacked work pieces each of which is of generally cylindrical shape having one flat side and a lateral projection at the opposite side which comprises:
advancing a series of work pieces in a single continuous array with their edges in contact and with all work pieces with like orientation with respect to the location of the lateral projections thereon,
separating the work pieces as they advance into two groups,
inverting all of the work pieces in one group,
stacking the work pieces in pairs, with one work piece from each group and with the flat sides thereof in contact, and
successively pot broaching the pairs of stacked work pieces.

2. The method defined in claim 1, which further comprises.
separating the broached work pieces into a first group consisting of the upper work pieces of the pairs and a second group consisting of the lower work pieces of the pairs,
inverting all of the work pieces of one of said groups, and
depositing said work pieces in a single main outlet conveyor section in a single continuous array with all work pieces having like orientation with respect to the lateral projections.

3. Apparatus for broaching successive pairs of stacked work pieces in which each work piece is of generally cylindrical shape having one flat side and a lateral extension at the opposite side, which comprises a loader conveyor system including
a main inlet section in which a series of work pieces advance in a single continuous array with the edges of adjacent pieces in contact and with like orientation with respect to the location of the lateral projections thereon,
a first branch inlet inverter section positioned to receive work pieces from said main inlet section and arranged to invert work pieces as they pass therethrough,
a second branch inlet section also positioned to receive work pieces from said main inlet section and to pass work pieces therethrough without inversion,
means for advancing work pieces into said branch inlet sections,
an assembly section positioned to receive work pieces from said branch inlet sections in stacked pairs with their flat sides in contact, with their axes vertical, and with opposite orientation with respect to the lateral projections thereon,
means to advance stacked pairs of work pieces successively to initial broaching position,
a vertical generally tubular pot broach having interior cutting elements, an open upper end, and an open lower end above the initial broaching position of the work pieces, and
a pusher at said initial broaching position on which each pair of stacked work pieces is received,
a vertical piston and cylinder device connected to said pusher adapted when energized to push a pair of stacked work pieces upwardly through said pot broach and out of its upper end,
and means for retaining each pair of stacked broached work pieces as said pusher is lowered,
said piston and cylinder device being operable to return said pusher down through said broach to receive the next pair of stacked work pieces.

4. Apparatus as defined in claim 3 in which said first branch inlet inverter section comprises an enclosed chute curved in a vertical plane to occupy substantially 180°, the inlet end of said section being substantially directly above its outlet end.

5. Apparatus as defined in claim 4, which comprises stops at the outlet ends of said branch inlet sections to be engaged by the leading work piece in each of said inlet sections, the outlets ends of said branch inlet sections being arranged one above the other, whereby the leading work pieces in each branch inlet sections are stacked one upon the other, with their flat sides in contact.

6. Apparatus as defined in claim 4, comprising stop means to maintain both of said branch inlet sections full of work pieces, and feed means to push one work piece laterally from said main inlet section into said second branch inlet section and to push the work piece at the bottom of said curved chute along in said branch inlet inverter section.

7. Apparatus as defined in claim 3, in which main inlet section is arranged to receive the work pieces with their flat sides down and the lateral projections up.

8. Apparatus as defined in claim 3, which further comprises
an unloader conveyor system comprising
a first outlet section for receiving stacked pair of broached work pieces,
transfer means to advance stacked pairs of broached work pieces from the top of said pot broach along said first outlet section,
a first branch outlet inverter section positioned to receive one of the work pieces of each stacked pair and to invert the pieces as they pass therethrough,
a second branch outlet section positioned to receive the other work pieces of each stacked pair and to pass work pieces therethrough without inversion, and a main outlet section arranged to receive work pieces from both branch outlet sections in a single series with all broached work pieces having the same orientation with respect to the lateral projections thereon.

9. Apparatus as defined in claim 8, in which said first branch outlet inverter section comprises an enclosed chute curved in a vertical plane to occupy substantially 180°, the inlet end of said section being substantially directly above its outlet end.

10. Apparatus as defined in claim 8 which comprises oppositely inclined guided means cooperating respectively with the upper and lower work pieces of each pair and operable to divert work pieces passing through the first outlet section of the unloader conveyor respectively into the first and second branch outlet sections.

* * * * *